(12) United States Patent
Anderson et al.

(10) Patent No.: US 9,348,654 B2
(45) Date of Patent: May 24, 2016

(54) MANAGEMENT OF VIRTUAL MACHINE MIGRATION IN AN OPERATING ENVIRONMENT

(71) Applicant: International Business Machines Corporation, Armonk, NY (US)

(72) Inventors: Jason L. Anderson, San Jose, CA (US); Nimesh Bhatia, San Jose, CA (US); Gregory J. Boss, Saginaw, MI (US); Animesh Singh, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 14/083,692

(22) Filed: Nov. 19, 2013

(65) Prior Publication Data

US 2015/0143364 A1    May 21, 2015

(51) Int. Cl.
*G06F 9/455* (2006.01)
*G06F 9/46* (2006.01)
*G06F 15/173* (2006.01)
*G06F 9/50* (2006.01)
*G06F 9/48* (2006.01)

(52) U.S. Cl.
CPC .............. *G06F 9/5088* (2013.01); *G06F 9/455* (2013.01); *G06F 9/45558* (2013.01); *G06F 9/48* (2013.01); *G06F 9/485* (2013.01); *G06F 9/4843* (2013.01); *G06F 9/4862* (2013.01); *G06F 9/4875* (2013.01); *G06F 9/4881* (2013.01); *G06F 9/4893* (2013.01); *G06F 9/50* (2013.01); *G06F 9/5005* (2013.01); *G06F 9/505* (2013.01); *G06F 9/5011* (2013.01); *G06F 9/5016* (2013.01); *G06F 9/5027* (2013.01); *G06F 9/5044* (2013.01); *G06F 9/5083* (2013.01); *G06F 9/5094* (2013.01); *G06F 2009/4557* (2013.01)

(58) Field of Classification Search
None
See application file for complete search history.

(56) References Cited

U.S. PATENT DOCUMENTS 8,370,473 B2    2/2013   Glikson et al.
8,615,579 B1 *  12/2013  Vincent et al. ................ 709/224
(Continued)

FOREIGN PATENT DOCUMENTS

EP    2417534 A2    2/2012

OTHER PUBLICATIONS

Grit et al., "Virtual Machine Hosting for Networked Clusters: Building the Foundations for "Autonomic" Orchestration", VTDS 2006: First International Workshop on Virtualization Technology in Distributed Computing, 2006, pp. 1-7. DOI: 10.1109/VTDC.2006.17.

(Continued)

*Primary Examiner* — Charles Swift
(74) *Attorney, Agent, or Firm* — Brian Welle; Jinesh Patel

(57) ABSTRACT

Embodiments directed toward a method, and a system. A method can be directed toward deciding whether to accept a virtual machine migration on a host. The method can include receiving a request to host a migrated virtual machine. The method can include determining if the host is overcommitted. The method can include selecting a low priority virtual machine in response to the host being overcommitted. The method can include determining if a resource for the low priority virtual machine can be reduced to accommodate the migrated virtual machine. The method can include reducing the resources for the low priority virtual machine in response to the resources being able to be reduced. The method can include accepting the request to host the migrated virtual machine in response to the reduction of the resources.

8 Claims, 7 Drawing Sheets

(56) References Cited

U.S. PATENT DOCUMENTS

| | | | |
|---|---|---|---|
| 2006/0005189 A1* | 1/2006 | Vega | G06F 9/4856 718/1 |
| 2006/0069761 A1* | 3/2006 | Singh et al. | 709/222 |
| 2008/0163239 A1* | 7/2008 | Sugumar | G06F 9/5088 718/105 |
| 2009/0327781 A1* | 12/2009 | Tripathi | 713/324 |
| 2010/0169253 A1* | 7/2010 | Tan | 706/21 |
| 2010/0251234 A1* | 9/2010 | Oshins | 718/1 |
| 2011/0239010 A1* | 9/2011 | Jain et al. | 713/310 |
| 2012/0036515 A1 | 2/2012 | Heim | |
| 2012/0137289 A1* | 5/2012 | Nolterieke et al. | 718/1 |
| 2012/0137292 A1* | 5/2012 | Iwamatsu et al. | 718/1 |
| 2012/0151490 A1* | 6/2012 | Zhang et al. | 718/102 |
| 2012/0185848 A1* | 7/2012 | Devarakonda | G06F 9/45533 718/1 |
| 2013/0060988 A1 | 3/2013 | Dow et al. | |
| 2013/0073731 A1 | 3/2013 | Bose et al. | |
| 2014/0208329 A1* | 7/2014 | Abali et al. | 718/104 |
| 2014/0229949 A1* | 8/2014 | Cai | 718/1 |
| 2014/0359356 A1* | 12/2014 | Aoki | 714/24 |

OTHER PUBLICATIONS

Ishakian et al., "Colocation as a Service: Strategic and Operational Services for Cloud Colocation", 2010 Ninth IEEE International Sumposium on Network Computing and Applications (NCA), 2010, pp. 76-83, © 2010 IEEE. DOI: 10.1109/NCA.2010.17.

Mell et al., "The NIST Definition of Cloud Computing", National Institute of Standards and Technology, NIST Special Publication 800-145, Sep. 2011, Gaitersburg, MD.

* cited by examiner

MANAGEMENT OF VIRTUAL MACHINE MIGRATION IN AN OPERATING ENVIRONMENT

BACKGROUND

This disclosure generally relates to the field of information processing systems, and more particularly relates to managing the placement of virtual machines on a network. Virtual machines (abbreviated VM herein) may help to more efficiently use physical processing resources by allowing one computer system to support functions normally performed by multiple separate computer systems. By virtualizing a hardware resource in a cloud-based network, a single hardware resource may support multiple virtual machines in a flexible manner that provides improved utilization of the processing resource. Further, if a physical processing resource in a cloud-based network becomes over-utilized, virtual machines may migrate to other physical processing resources of the cloud-based network that may have processing capacity.

In parallel, pervasive devices have become part of everyday life. While their main purpose is to enable voice communication, new features are transforming cell phones into multipurpose devices. With every new feature, dependence on pervasive devices increases. In particular special purpose applications have become popular for such devices.

SUMMARY

Embodiments of the present disclosure relate to methods, and a system for placement of a plurality of virtual machines on a hardware resource.

A computer-implemented method for migrating a virtual machine can include monitoring a first host hosting a plurality of virtual machines for a virtual machine migration event. The method can include determining whether the virtual machine migration event causes the first host to be overcommitted. The method can include identifying a low priority virtual machine on the first host in response to the first host being overcommitted. The method can include implementing an optimization path for the low priority virtual machine on the first host.

Another method can be directed toward deciding whether to accept a virtual machine migration on a host. The method can include receiving a request to host a migrated virtual machine. The method can include determining if the host is overcommitted. The method can include selecting a low priority virtual machine in response to the host being overcommitted. The method can include determining if a resource for the low priority virtual machine can be reduced to accommodate the migrated virtual machine. The method can include reducing the resources for the low priority virtual machine in response to the resources being able to be reduced. The method can include accepting the request to host the migrated virtual machine in response to the reduction of the resources.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

Figure 1:
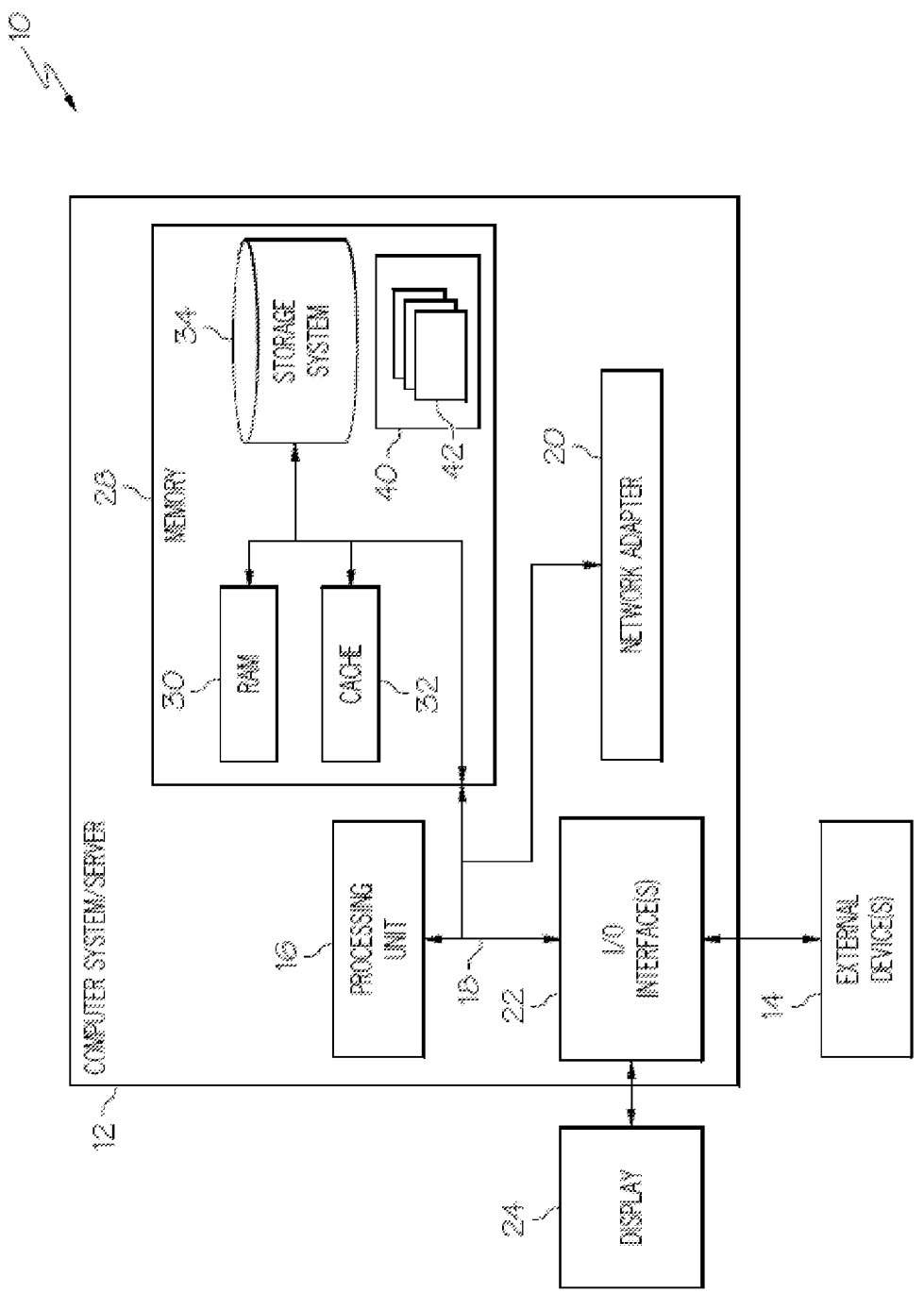
FIG. 1 depicts an operating environment, according to various embodiments.

Aspects of the present disclosure are directed toward accepting a migrated virtual machine (VM) on a host by moving or shrinking VMs on a plurality of hosts to accommodate the migrated VM. The moving can take place in a cascading manner with the migration of one VM on one host impacting the migration of other VMs on different hosts. Shrinking a VM can refer to reducing the resources available for a VM. Although not necessarily limited thereto, embodiments of the present disclosure can be appreciated in the context of migrating VMs.

In the descriptions provided herein, specific details of various embodiments are provided. However, various embodiments may be practiced with less than all of these specific details. In other instances, certain methods, procedures, components, structures, and/or functions are described in no more detail than to enable the various embodiments of the disclosure, for the sake of brevity and clarity.

VMs can share access to one or more hosts. Consistent with various embodiments, a host can be capable of supporting a particular number of VMs. When VMs are targeted for migration to a host and the host is overutilized, embodiments of the present disclosure are directed toward selecting a path for a host supported VM. VM migration can be initiated because of limited capacity on a host or potentially due to system emergencies, e.g., crashes on a host. The path can involve migrating the host supported VM to another host or shrinking the resources of host supported VM to accommodate the VM being migrated.

The hosts that support one or more VMs can be distributed throughout an operating environment. In various embodiments, the host can include one or more processors devoted to processing computer instructions. For example, a host can include a processor core, a server blade, input/output devices, a computer, a laptop, processing access time to a mainframe, or combinations thereof.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
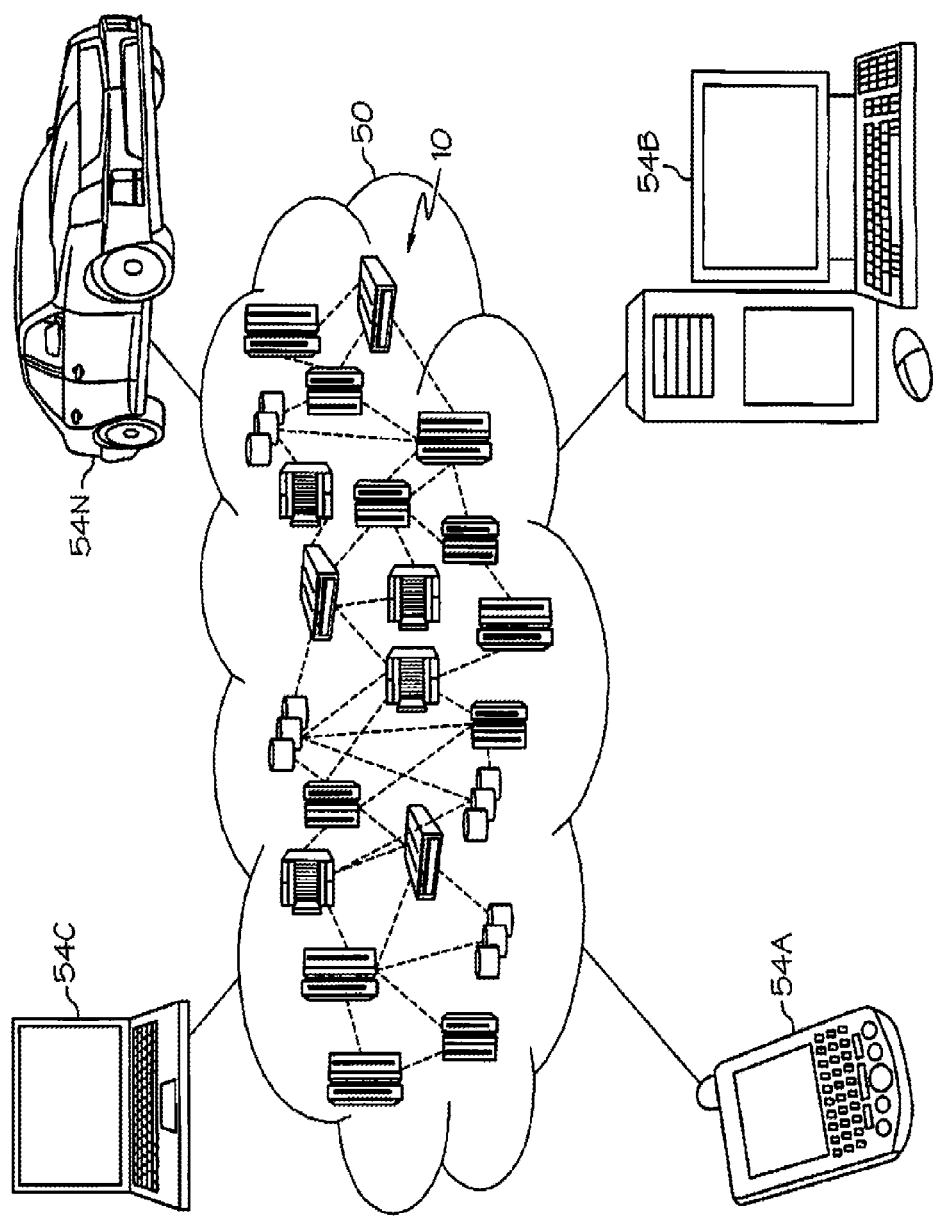
FIG. 2 depicts a cloud computing environment, according to various embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
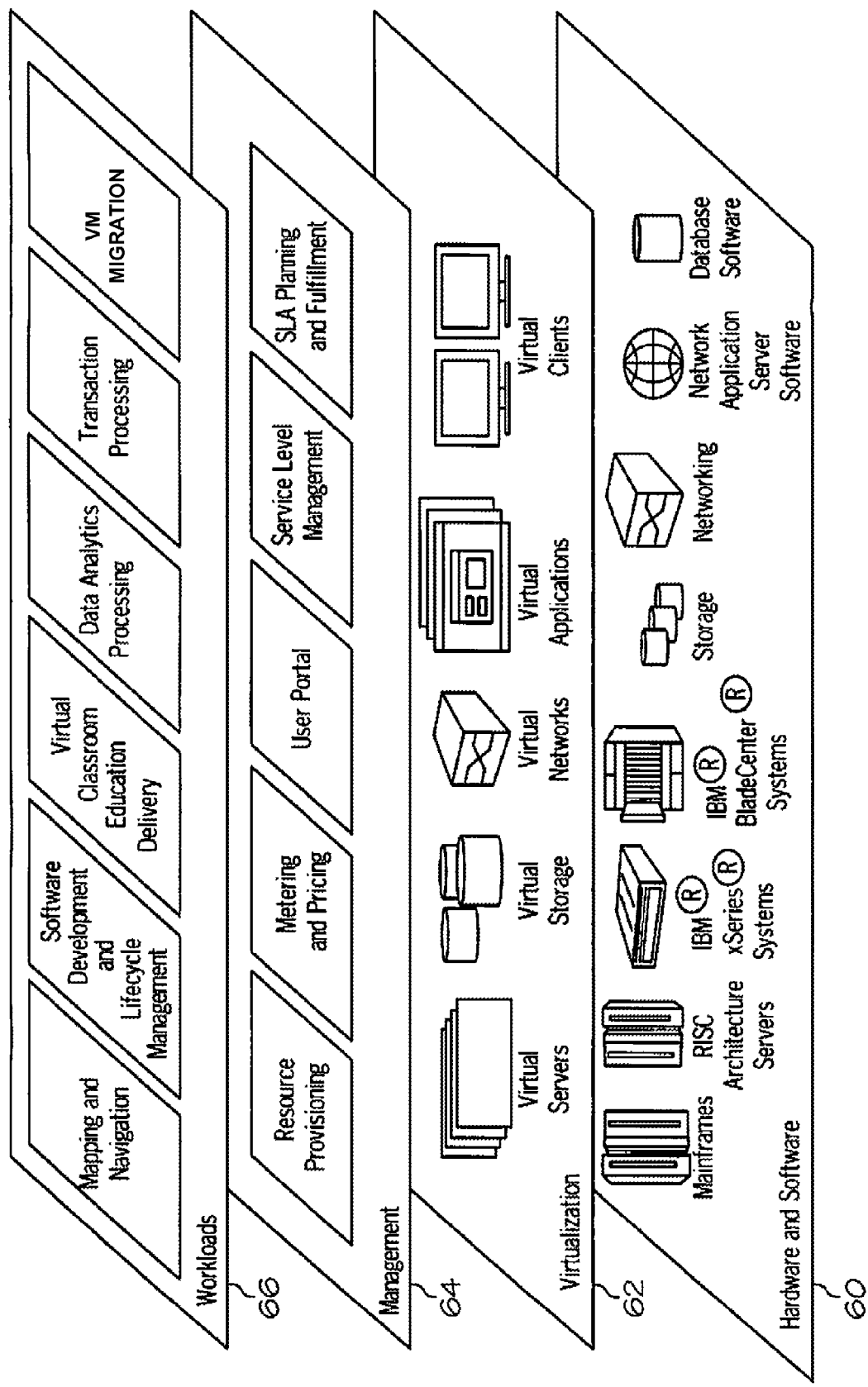
FIG. 3 depicts a set of functional abstraction layers provided by the cloud computing environment, according to various embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and VM migration.

Figure 4:
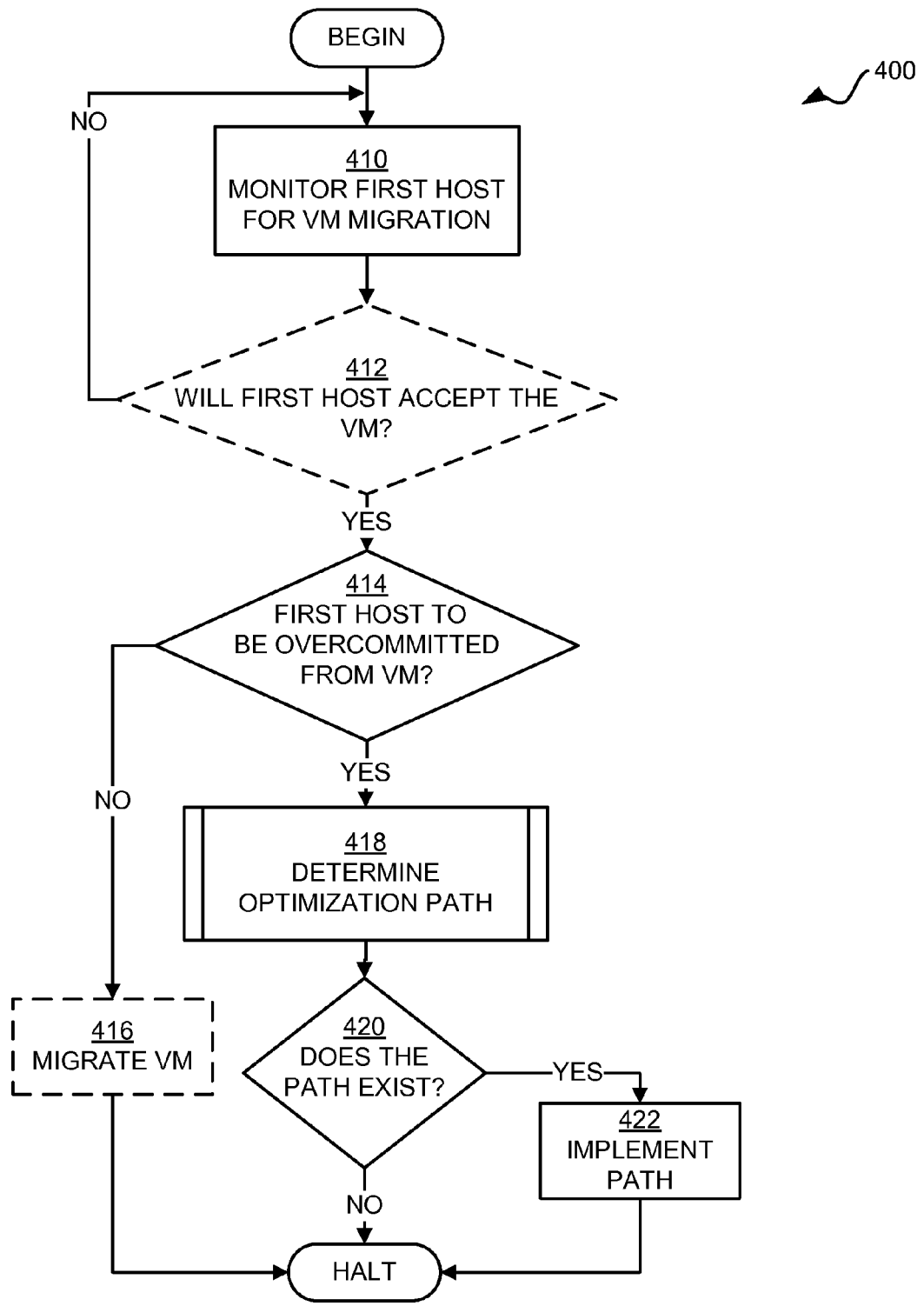
FIG. 4 depicts a method of migrating a VM to a host, according to various embodiments.

FIG. 4 depicts a method 400 of migrating a VM to a host, according to various embodiments. The host may be overcommitted. An overcommitted host can result when a hardware infrastructure of a receiving compute node, or first host, is inconsistent with the workload caused by a VM migrating to the first host. The VM migrating to the first host may be referred to as an initial migrated VM. Generally, the initial migrated VM can cause the first host to migrate a first host supported VM to a second host or cause the first host to shrink the resources of the first host supported VM. The method 400 can begin at operation 410.

In operation 410, a virtualization manager can monitor and detect a host for a VM migration event. The virtualization manager can control the virtual machines in a cloud computing environment. The virtualization manager can be a program module 42 from FIG. 1 and be configured to perform the method described herein. The VM migration event can be initiated by a request from a losing host to migrate the initial migrated VM to the first host. The VM migration event can also occur when the initial migrated VM is migrated automatically to the first host, according to various embodiments. The VM migration event can also occur when a new VM is created on the first host.

In various embodiments, a dependent second VM can be dependent on the initial migrated VM. The virtualization manager can treat both the dependent second VM and the initial migrated VM as a single unit. The dependent second VM can be migrated after or simultaneously with the initial migrated VM. Examples where certain VMs depend on other VMs may occur where a web server, an application server, and a database can be moved as a single block. Sub-workload dependency can also be deployed. In sub-workload dependency, the dependency can be established by the workload. For example, if a database is accessed by an application frequently, then only the database and application server are dependent. All other components of the web application can be hosted on different hosts. After the first host is monitored for a VM migration event, then the method 400 can continue operation 412.

In operation 412, the virtualization manager can determine whether the first host will accept the initial migrated VM. In various embodiments, the first host can reject the initial migrated VM if the initial migrated VM is outside of particular parameters. For example, the initial migrated VM can require a certain amount of resources beyond the physical limitations of the first host. In various embodiments, the first host does not have to automatically accept the initial migrated VM, but can simulate or predict the optimization path in order to make a decision on whether to accept the initial migrated VM. If the host does not accept the initial migrated VM by avoiding the acceptance of the initial migrated VM, then the method 400 can continue to operation 410 where the first host can monitor for incoming VM migrations.

The virtualization manager can automatically accept the VM migration and could allow operation 412 to be optional. The initial migrated VM can be within a particular range or outside of a range of particular parameters. If the host accepts the initial migrated VM, then the method continues to operation 414.

In operation 414, the virtualization manager can determine whether the acceptance of the initial migrated VM causes the first host to be overcommitted. In various embodiments, the first host can be overcommitted if the initial migrated VM causes the host to be beyond an overcommitment threshold. In various embodiments, the overcommitment threshold can be based on resources such as the number of CPU cycles available to a VM. For example, if there are 3 million CPU cycles/second available to all the VMs on the first host and the current usage of VMs on the first host is 2.5 million CPU cycles/second, then the addition of an initial migrated VM that requires 1 million CPU cycles/second can go beyond the overcommitment threshold of the first host. In various embodiments, the first host can determine whether it is overcommitted and notify the virtualization manager of the overcommitment.

If the host will not be overcommitted, then the method 400 can continue to operation 416 where the initial migrated VM is migrated to the host. Operation 416 can be optional in various embodiments. For example, if the first host is configured to automatically accept the initial migrated VM, then the initial migrated VM can be accepted by the first host prior to operation 414. If the first host will be overcommitted, then the method 400 can continue to operation 418. In various embodiments, it may not be possible for other hosts beside the first host to host the initial migrated VM. For example, the initial migrated VM could only be hosted by the first host due to system policies.

In operation 418, the virtualization manager can determine one or more optimization paths for virtual machines on the first host. The optimization path can allow the first host to free up resources to accommodate the initial migrated VM. The optimization path can involve a combination of migrating first host supported VMs to a second host and/or shrinking the first host supported VMs on the first host.

According to various embodiments, the optimization path can include the first host automatically shrinking the resources of a first host supported VM. The shrinking of resources can be further described herein in FIG. 5. If the resources of the first host are beyond an overcommitment threshold after the shrinking, then first host can migrate one or more first host supported VMs to a second host. The optimization path can also include the first host automatically migrating a first host supported VM to a second host when the overcommitment threshold is surpassed.

The optimization path can be determined based on the host. For example, the analysis can be limited to the first host. Once it is determined that the first host cannot shrink any first host supported VMs and must migrate a first host supported VM, a first host supported VM can be selected from the first host to migrate. The first host can request to migrate one or more VMs in a virtual circle. The virtual circle can be a communicative arrangement with a number of hosts for the purpose of migrating VMs. For example, the virtual circle for a first host can be to migrate a first host supported VM to a second host, for the second host to migrate a second host supported VM to the third host, and for the third host to migrate a third host supported VM to the first host. Even though a simple virtual circle is described, more complex interactions between the hosts are contemplated.

Therefore, the determinations made on the first host do not have an impact on the selection of actions on the second host. The second host can independently determine whether to accept a VM migration from the first host. The first host can optionally pass along the thresholds and metrics used for the decision to request migrating the first host supported VM to the virtual circle.

According to various embodiments, the optimization path can also be predicted using the virtualization manager. The virtualization manager can then determine which optimization path to implement. In various embodiments, an optimization path can be created on the fly and implemented immediately without predicting the result. Once the optimization path is determined, then the method 400 can continue to operation 420.

In operation 420, the virtualization manager can determine whether the optimization path exists. The optimization path can exist where the first host supported VMs can be migrated to other hosts or shrunk in order to accommodate the initial migrated VM. The optimization path may not exist in various embodiments. For example, if a VM in the virtual circle cannot be migrated or shrunk to accommodate the initial migrated VM, then the optimization path does not exist and the method 400 halts.

In various embodiments, the virtualization manager can alert an administrator of the initial migrated VM that the initial migrated VM cannot be migrated to the second host and stop the migration. The halting can occur in the event of a large incoming migration of initial migrated VMs with a high priority requesting migration beyond the limits of the virtual circle. A hysteresis value can also be used to limit an infinite number of requests for VM migration. If the optimization path does exist, then the method 400 can continue to operation 422.

In operation 422, the virtualization manager can implement the path. The virtualization manager can implement the path by directing the hosts to accept the initial migrated VMs or shrink existing VMs on a host. In various embodiments, the virtualization manager can direct a particular host to automatically accept an initial migrated VM without a determination of the optimization path.

Figure 5:
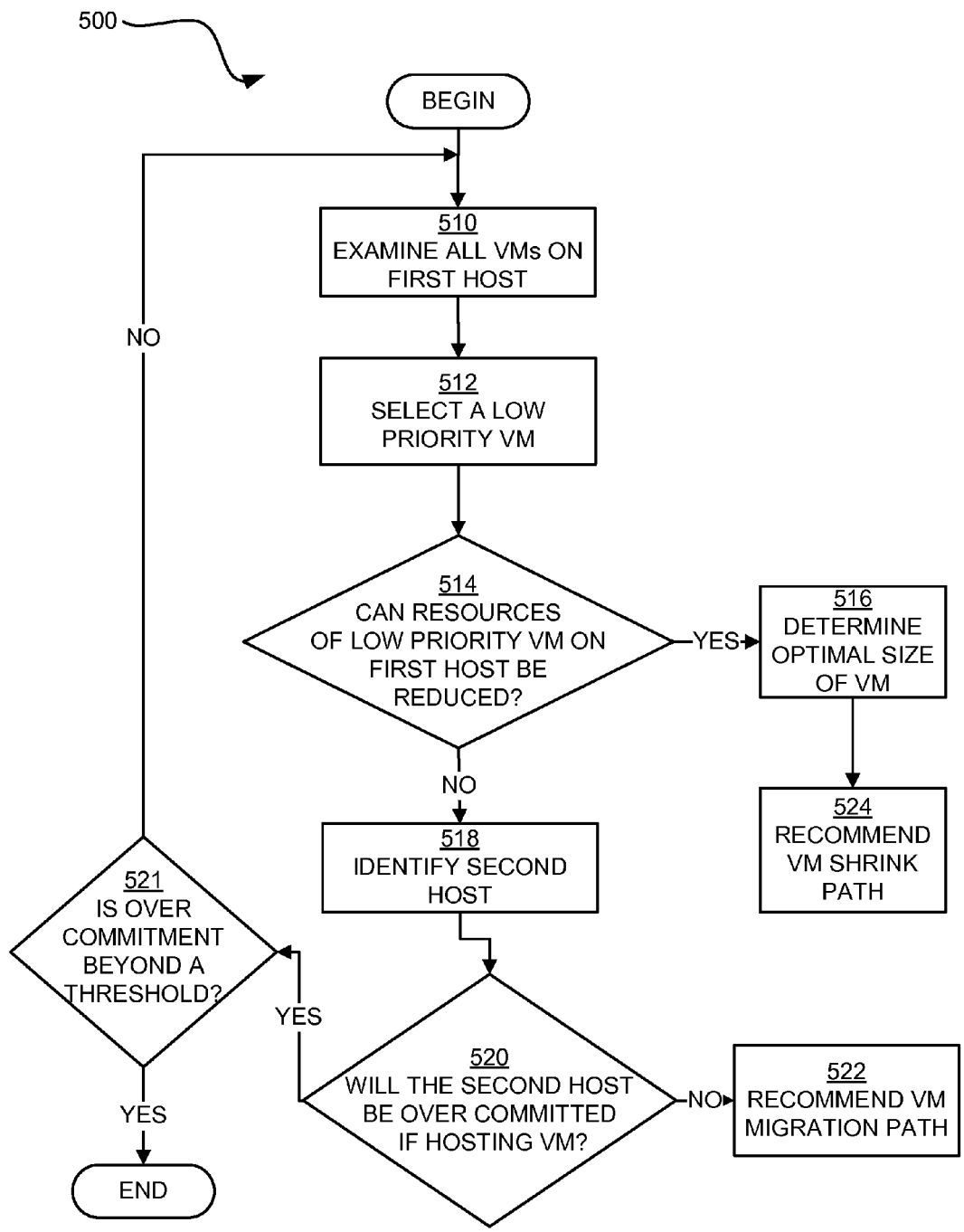
FIG. 5 depicts a method of determining an optimization path for migrating a VM, according to various embodiments.

FIG. 5 depicts a method 500 of determining an optimization path, according to various embodiments. The method 500 can correspond to operation 418 in FIG. 4. The method 500 can determine how one or more VMs in the virtual circle can be routed or shrunk. The method 500 can begin at operation 510.

In operation 510, the virtualization manager can examine all of the first host supported VMs on the first host. Each host can support one or more VMs. The virtualization manager can receive information about the VMs for each host, e.g., the total resources on each host, number of VMs, and the resources required by each VM. After all of the VMs on the first host are examined, then the method 500 can continue to operation 512.

In operation 512, the first host can identify a low priority VM. The low priority VM may be a first host supported VM that has a lower value relative to other first host supported VMs. The low priority VM can be established by a value index in various embodiments. For example, the VM value index can be established using the proportional load of a VM in a host. So if a first VM requires 3 million CPU cycles/second out of 5 million CPU cycles/second, and a second VM requires 2 million CPU cycles/second out of 5 million CPU cycles/second, and an initial migrated VM requires 1 million CPU cycles/second, then the virtualization manager can give a lower priority to the second VM. In this example, the second VM requires fewer resources relative to the total resources.

The low priority VM can be established by a cost. Using the aforementioned example, the virtualization manager can select the second VM as the low priority VM because the cost is less than that of the first VM. The low priority VM can be established on a relative basis or in an absolute basis. For example, the low priority VM can be selected based on a threshold value for performance or can be selected based on the value relative to another VM in the first host.

The low priority VM can also be established by a network policy regarding different types of data. For example, if a VM processes secure data, then the virtualization manager may not be able to make any changes to the VM and would give a corresponding high priority. If the VM processes low traffic websites, then the virtualization manager can have a low priority. The priority can be given as an importance score. In another example, VM supporting an application server can be designated as a low priority but a VM supporting a database can be exempt from low priority status.

In various embodiments, the usage trend can influence the priority of the VM. For example, if a historical usage indicates that the usage of the VM peaks on Friday afternoons but is constant on other periods, then the virtualization manager can avoid selecting the VM as low priority during Friday afternoons. After the low priority method is selected, then the method 500 can continue to operation 514.

In operation 514, the virtualization manager can determine whether the resources of the low priority VM on the current host can be reduced. In various embodiments, the resources can be reduced if the performance of the low priority VM is below a particular shrinkage threshold, and the resource reduction is allowed by a system policy. The system policy can allow or disallow the shrinking of a particular low priority VM.

The shrinkage threshold can be determined by a performance of the VM. For example, the virtualization manager can determine that the VM can be shrunk if the value index is beyond a shrinkage threshold. The formula can resemble the formula:

$$\text{Index} = \frac{\text{Capacity}_{lowpriorityVM} - \text{Capacity}_{requiredbyhost}}{\text{Capacity}_{lowpriorityVM}}$$

If the host is overcommitted by 4 million CPU cycles/second and the host has a low priority VM that has a capacity of 3 million CPU cycles/second, then there is not a way for the low priority VM to be reduced because the 4 million CPU cycles/second is more than can be freed by shrinking 3 million CPU cycles/second to zero. Thus, the percentage of shrinkage capacity is 3-4 million CPU cycles/second/3 million CPU cycles/second=−33%.

However, if the host is overcommitted by half a million CPU cycles/second, then the virtualization manager can shrink the low priority VM to (3 million CPU cycles/second−0.5 million CPU cycles/second)/3 million CPU cycles/second=83% of the original capacity. Therefore, if the shrinkage threshold is 50% of the original capacity, then the virtualization manager can shrink the low priority VM on the host by 0.5 million CPU cycles/second. According to various embodiments, more than one VM can be shrunk in a host. The number of VMs to be shrunk can depend on the shrinkage threshold and the number of VMs on the host. Assuming that the low priority VM can be shrunk, then the method 500 can continue to operation 516. If the low priority VM cannot be shrunk, then the method 500 can continue to operation 518.

In operation 516, the virtualization manager can determine the optimal size of the shrunk resource. In various embodiments, the optimal size can be proportional to the demand on the host. For example, if the host is overcommitted by 0.3 million CPU cycles/second, then the low priority VM can be shrunk by 0.3 million CPU cycles/second. If the shrinking would make the low priority VM fall past a shrinkage threshold, e.g., because the low priority VM would be shrunk by too great of an amount proportionally, then another host supported VM can also be shrunk simultaneously so that the low priority VM does not fall past the shrinkage threshold.

In order to determine the optimal size of the VM, the virtualization manager can compare the current usage with a historical usage pattern. If the historical usage of the low priority VM indicates a spike of users within the next hour, then the low priority VM can be shrunk by a minimal amount.

The virtualization manager can also establish a weight for each factor to establish an optimal VM size. For example, the virtualization manager can give a high weight for each user on the VM and a low weight to the performance. Therefore, a VM with a high amount of users can be shrunk less than a VM with low performance. In various embodiments, the virtualization manager can create a deployment plan and submit it to a provisioning engine. Once the optimal VM size is determined, then the method 500 can continue to operation 524. In operation 524, the virtualization manager can recommend the VM shrink path to the first host and the first host can shrink the VM.

If the resource of the low priority VM can not be reduced, then the method 500 can continue to operation 518. In operation 518, the virtualization manager can examine the second host in the virtual circle and predict whether migrating the low priority VM to the second host will result in over committing the second host. The second host can be a host that would be next in priority to migrate a VM. In various embodiments, the second host can be a host in the same geographic area or a different geographic area. The second host can be determined by the network latency relative to the second host. For example, if the first host to second host network latency is 5 ms and the first host to third host network latency is 10 ms, and the second host to third host network latency is 8 ms, then the second host can be the second host to the first host. Once the second host is identified, then the method 500 can continue to operation 520.

In operation 520, the virtualization manager can determine whether the second host will be overcommitted if the second host hosts the low priority first host supported VM. The analysis for operation 518 can be similar to operation 414 in FIG. 4. In determining whether the second host will be overcommitted, the virtualization manager can predict or simulate the actions on the second host. In various embodiments, the low priority VM can predict overcommitment based on a resource requirement. For example, if the low priority VM requires 5 million CPU cycles/second, and the second host has 2 million CPU cycles/second, then the virtualization manager can predict that the second host will be overcommitted.

The virtualization manager can also predict whether the second host will be overcommitted by calculating a value index for each prediction from the low priority virtual machine migration event. For example, the value index for each prediction can include a combination of the performance and cost. Once determined, the value index for one prediction can be compared to other predictions and the virtualization manager can select the prediction with the least impact. If the second host will not be overcommitted, then the method 500 can continue top operation 522.

If the second host will be overcommitted, then the method 500 can continue to operation 521. In operation 521, if the second host will be overcommitted, then the virtualization manager can determine whether the overcommitment is beyond an overcommitment threshold. The overcommitment threshold can be a value that determines a degree of overcommitment. For example, if a second host will be overcommitted by 200% and the overcommitment threshold is 50%, then the overcommitment would be beyond the overcommitment threshold and the method 500 would end.

In various embodiments, the virtualization manager can attempt to reselect a second host to determine whether the low priority VM can be migrated to the reselected second host. In various embodiments, the shrinkage threshold on a host can be adjusted relative to an overcommitment threshold for the second host. Assuming that the shrinkage threshold is greater than the overcommitment threshold, then the preference of the virtualization manager would be to continuously migrate the VMs.

If the overcommitment is outside the overcommitment threshold, then the method 500 can continue to operation 510. In operation 510, the analysis can begin by selecting the second host instead of the first host. For example, if the second host is predicted to be overcommitted, then the analysis of method 500 can take place using the second host, e.g., examining the VMs the second host, selecting a low priority VM on the second host, etc.

Returning to operation 520, if the second host will be overcommitted in hosting the VM, then the method 500 can continue to operation 522. In operation 522, the virtualization manager can recommend the optimization path. The optimization path can occur on multiple hosts. For example, a first host supported VM can migrate from a first host to a second host. The overcommitment of the second host can result in the migration of a low second host supported priority VM to a third host. The third host can shrink a low priority third host supported VM.

Figure 6:
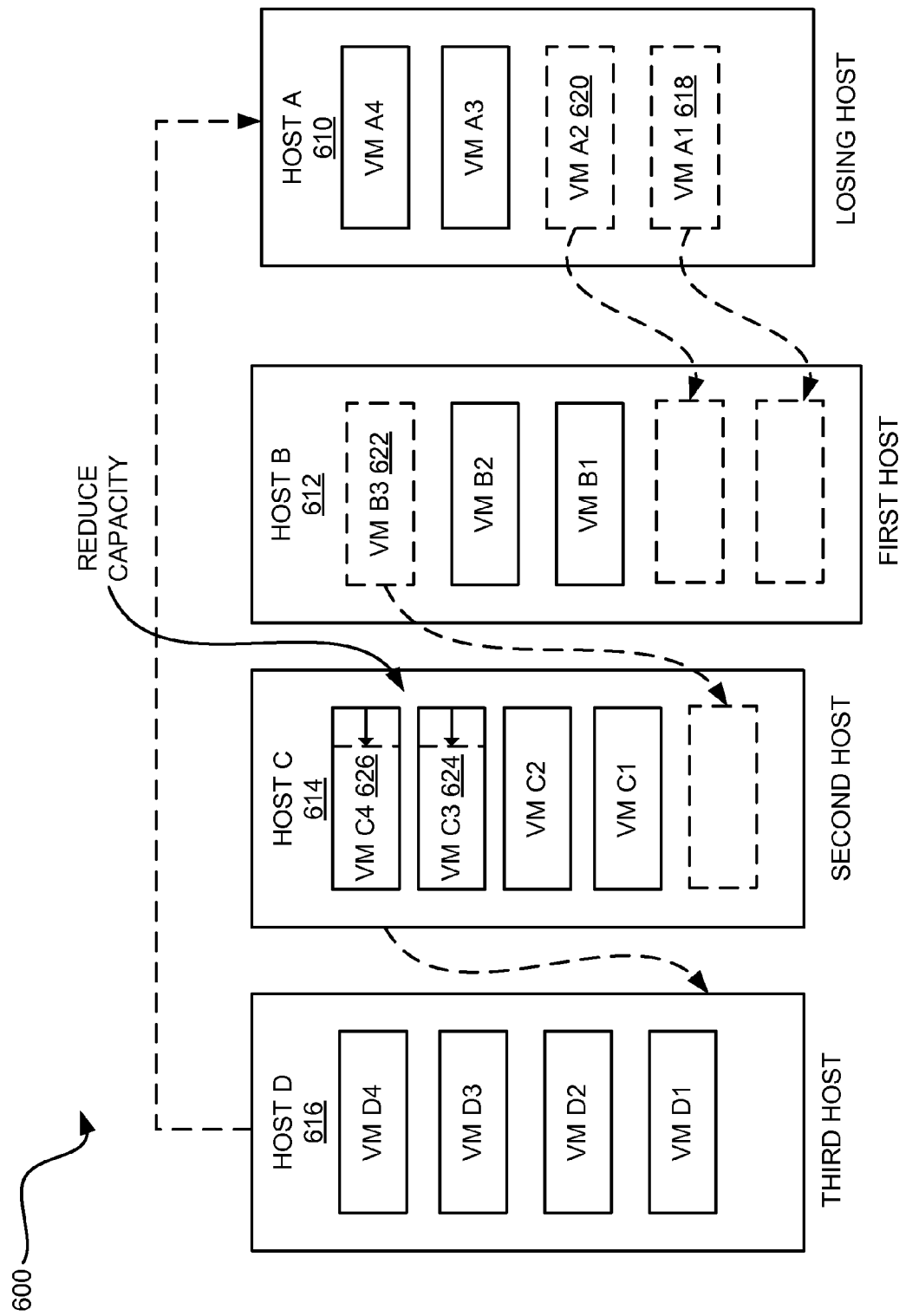
FIG. 6 depicts a system that adopts a optimization path for accepting a VM, according to various embodiments.

FIG. 6 depicts a system 600 that adopts an optimization path for accepting a VM, according to various embodiments. The system 600 can have four hosts; host A 610, host B 612, host C 614, and host D 616 arranged in a virtual circle. Each host can have a number of supported virtual machines. The virtual circle can allow host A 610 to request resources from host B 612, host B 612 to request resources from host C 614, host C 614 to request resources from host D 616, and host D 616 to request resources from host A 610. Various configurations of the virtual circle are possible including multiple dependencies between each host.

Host A 610 can have a VM A1 618 and a dependent VM A2 620. During migration, host A 610, the losing host, can migrate VM A1 618 and VM A2 620 to host B 612, the host. The migration is indicated using the dashed box on the host. As discussed herein, host B 612 can be configured to automatically accept the VMs A1 618 and A2 620. In various embodiments, host B 612 can be configured to withhold permission to the VM migration until an optimization path can be established. For example, the system 600 can predict a path for migrating multiple VMs in response to the migration of VM A1 618 and VM A2 620.

Assuming the optimization path is predicted, host B 612 can determine a low priority VM. In the system 600, the low priority VM is identified as VM B3 622. Once identified, VM B3 622 can be evaluated for shrinking. If the VM B3 622 is within a shrinkage threshold, then the VM B3 622 can be shrunk. If the VM B3 622 is not within a shrinkage threshold, then VM B3 622 can be migrated to host C 614. The optimization path analysis can continue to host C 614.

Host C 614 can analyze a low priority VM. A host can identify more than one low priority VM. More than one low priority VM can exist, for example, where one VM is dependent on a low priority VM. In the system 600, both VM C3 624 and VM C4 626 are identified as low priority VMs. Host C 614 can determine that VM C3 624 and VM C4 626 are both within the shrinkage threshold and reduce the resources for both VM C3 624 and VM C4 626. Once shrunk, then the optimization path for the system 600 is complete. Since the optimization path for the system 600 is completed, then host D 616 does not have to be affected.

In various embodiments, the system 600 can predict multiple optimization paths and select the optimization path that uses the fewest resources or results in the highest performance. The system 600 can automatically accept any migrated VM and subsequently determine how to deal with the resource strain from the migrated VM.

Figure 7:
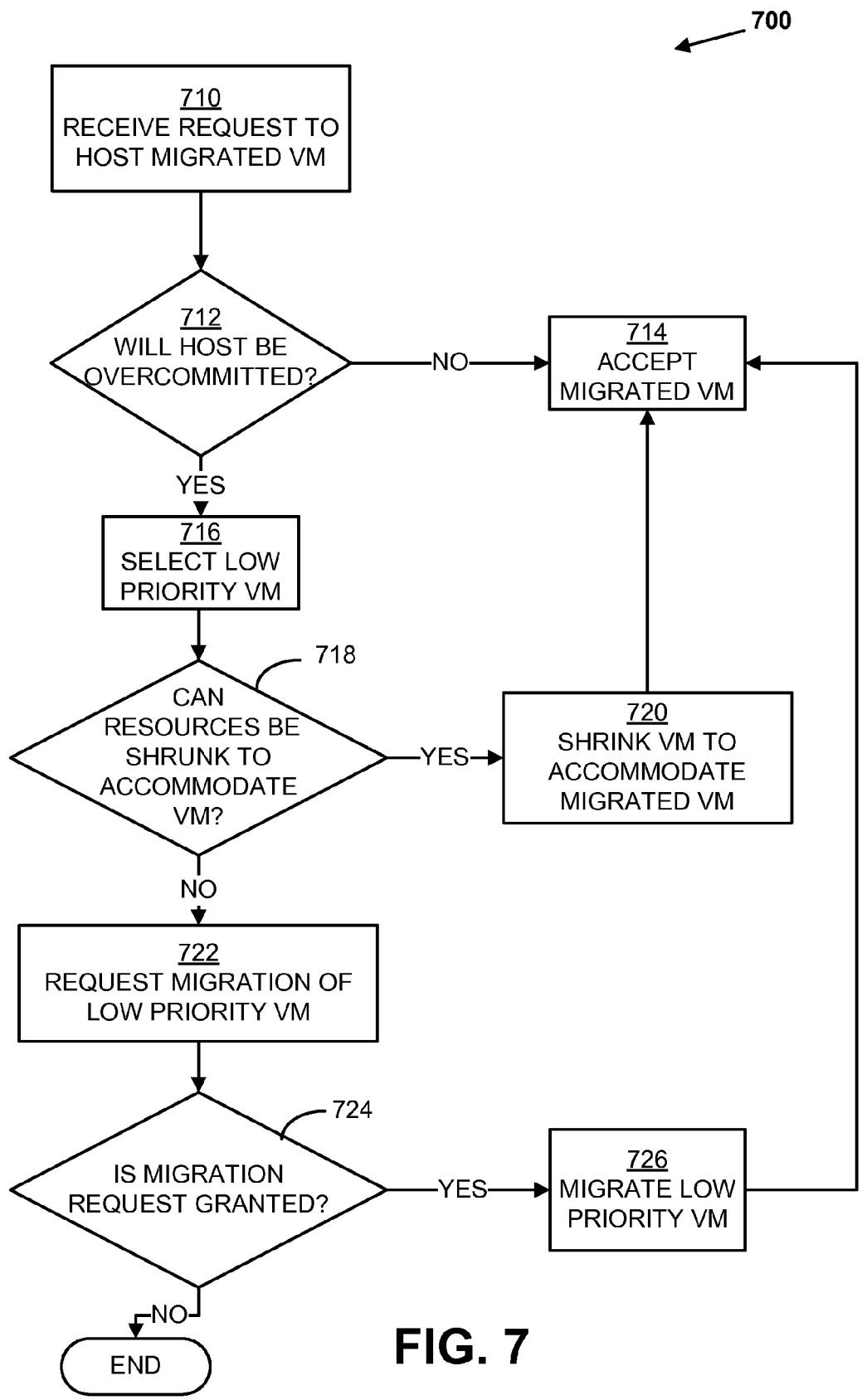
FIG. 7 depicts a method of deciding whether to accept a request to host a migrated VM, according to various embodiments.

FIG. 7 depicts a method 700 of deciding whether to accept a request to host a migrated VM, according to various embodiments. The method 700 can correspond to the methods 400, 500, in FIG. 4 and FIG. 5. In method 700, a determination by a host whether to accept a migrated VM can occur independent from other hosts within the virtual circle. The method 700 can be an example of an embodiment and is not meant to be limiting. The method 700 can begin with operation 710.

In operation 710, the host can receive a request to host a migrated VM. The migrated VM can also be an initial migrated VM, in some embodiments. The host can then determine if the host will be overcommitted in operation 712. Operation 712 can be similar in analysis to operation 414 in FIG. 4.

Assuming that the host will not be overcommitted, then the method 700 can continue to operation 714. In operation 714, the host can accept the migrated VM. In various embodiments, the acceptance can be the host sending an acceptance signal to the requesting host.

If the host will be overcommitted as a result of accepting the migrated VM, then the host can attempt to shrink the resources of hosted VMs on the host or migrate the hosted VMs to a second host in order to free up resources for the migrated host. To shrink the resources, the host can select a low priority VM in operation 716. Operation 716 can correspond to operation 512 in FIG. 5. Once selected, the method 700 can continue to operation 718.

In operation 718, the host can determine if the resources can be shrunk to accommodate the migrated VM. The analysis for operation 718 can correspond to operation 514 in FIG. 5. In various embodiments, the host can form a prediction.

If the resources can be shrunk in operation 718, the host can shrink the resources of a low priority VM to accommodate the migrated VM in operation 720. In operation 720, the host can determine the optimal size of the resource like in operation 516 of FIG. 5. In various embodiments, the host can shrink the resources automatically once the host determines that the low priority VM can be shrunk. Once the VM is shrunk in operation 720, the method 700 can continue to operation 714 where it can accept the migrated VM.

If the resources can not be shrunk in operation 718, then the method 700 can continue to operation 722. In operation 722, the host can request to other hosts in the virtual circle to migrate the low priority VM. In various embodiments, the low priority VM is assumed to be eligible for migration. The other hosts can be host that would be selected next in the virtual circle or on an unrelated host.

If the request for migration of the low priority VM is not granted, then the method 700 ends. If the host is overcommitted and cannot shrink or migrate another VM to free up resources, then the host can prompt a VM administrator to deactivate one or more low priority VMs. In various embodiments, the host can also refuse to accept the request to host the migrated VM.

If the request for migration of the low priority VM is granted, then the method 700 can continue to operation 726. In operation 726, the host can migrate the low priority VM to a second host and send an acceptance to the requesting host to accept the migrated VM. The acceptance and the migration can occur simultaneously or the low priority VM can be migrated before the migrated VM is accepted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for migrating a virtual machine among a plurality of hosts on a network, comprising:
  a first host of the plurality of hosts monitoring the first host hosting a first plurality of virtual machines for a first virtual machine migration event;
  the first host determining whether the first virtual machine migration event causes the first host to be overcommitted;
  the first host identifying a first low priority virtual machine on the first host in response to the first host being overcommitted;
  the first host determining a first optimization path that includes migrating a first low priority virtual machine to a second host of the plurality of hosts;
  determining that migrating the first low priority virtual machine to the second host would cause the second host to be overcommitted;
  identifying a set of low priority virtual machines on the second host in response to determining that migrating the first low priority virtual machine to the second host would cause the second host to be overcommitted, wherein resources for the set of low priority virtual machines can be reduced;
  determining a reduced set of resources for the set of low priority virtual machines by examining a current usage pattern and a historical usage pattern for the set of low priority virtual machines, wherein the reduced set of resources will uncommit enough resources that migrating the first low priority virtual machine would not cause the second host to be overcommitted;
  the first host implementing the first optimization path for the first low priority virtual machine on the first host without input from the second host, wherein the first optimization path includes migrating the first low priority virtual machine to the second host and reducing resources for the set of low priority virtual machines to the reduced set of resources;
  the second host automatically accepting the first low virtual machine;
  the second host monitoring the second host hosting a second plurality of virtual machines for a second virtual machine migration event;
  the second host determining whether the second virtual machine migration event causes the second host to be overcommitted;
  the second host identifying a second low priority virtual machine on the second host in response to the second host being overcommitted; and
  the second host implementing a second optimization path for the second low priority virtual machine on the second host.

2. The method of claim 1, further comprising:
  predicting, on a third host, whether a migration of the second low priority virtual machine causes the third host to be overcommitted; and
  migrating the second low priority virtual machine to the third host in response to the third host not being overcommitted, where the first low priority virtual machine is hosted on the second host.

3. The method of claim 1, wherein determining that migrating the first low priority virtual machine to the second host would cause the second host to be overcommitted further comprises:
  calculating a value index for a prediction for the first low priority virtual machine migration event; and
  selecting the prediction based on the value index.

4. The method of claim 1, wherein accepting the migration request comprises:
  determining whether the second host will be overcommitted beyond an overcommitment threshold; and
  transmitting the acceptance of the migration request to the first host in response to the second host being overcommitted within the overcommitment threshold.

5. The method of claim 4, further comprising:
  receiving, from the first host, data metrics used to determine the overcommitment and identify the first low priority virtual machine.

6. The method of claim 1, wherein the monitoring a first host comprises:
  detecting the first virtual machine migration event; and
  accepting a virtual machine migration from the first virtual machine migration event.

7. The method of claim 1, wherein determining whether the first virtual machine migration event causes the first host to be overcommitted comprises:
  receiving requirements from the plurality of virtual machines on the first host and the first low priority virtual machine from the first virtual machine migration event;
  determining a resource of the first host;
  comparing the requirements to the resource; and identifying an overcommitment in response to the requirements being greater than the resource and within an overcommitment threshold.

8. A system for migrating a virtual machine, comprising:
one or more computer processors of a first host, configured to:
   monitor a first plurality of virtual machines hosted on the first host for a first virtual machine migration event;
   determine whether the first virtual machine migration event causes the first host to be overcommitted;
   identify a first low priority virtual machine on the first host in response to the first host being overcommitted;
   identify a second host of the plurality of hosts to which the first low priority virtual machine will be migrated;
   determine that migrating the first low priority virtual machine to the second host would cause the second host to be overcommitted;
   identify a set of low priority virtual machines on the second host in response to determining that migrating the first low priority virtual machine to the second host would cause the second host to be overcommitted, wherein resources for the set of low priority virtual machines can be reduced;
   determine a reduced set of resources for the set of low priority virtual machines by examining a current usage pattern and a historical usage pattern for the set of low priority virtual machines, wherein the reduced set of resources will uncommit enough resources that migrating the first low priority virtual machine would not cause the second host to be overcommitted; and
   determine a first optimization path that includes migrating the first low priority virtual machine to a second host; and
   implement a first optimization path for the first low priority virtual machine on the first host without input from the second host, wherein the first optimization path includes migrating the first low priority virtual machine to the second host and reducing resources for the set of low priority virtual machines to the reduced set of resources;
one or more processor of the second host, configured to:
   automatically accept the first low priority virtual machine;
   monitor a second plurality of virtual machines hosted on the second host for a second virtual machine migration event;
   determine whether the second virtual machine migration event causes the second host to be overcommitted;
   identify a second low priority virtual machine on the second host in response to the second host being overcommitted; and
   implement a second optimization path for the second low priority virtual machine on the second host.

* * * * *